US 9,817,632 B2

United States Patent
Canitz

(10) Patent No.: US 9,817,632 B2
(45) Date of Patent: Nov. 14, 2017

(54) CUSTOM NARRATION OF A CONTROL LIST VIA DATA BINDING

(71) Applicant: Microsoft Technology Licensing, LLC, Redmond, WA (US)

(72) Inventor: James Andrew Canitz, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 337 days.

(21) Appl. No.: 13/769,826

(22) Filed: Feb. 19, 2013

(65) Prior Publication Data

US 2014/0237370 A1    Aug. 21, 2014

(51) Int. Cl.
   - *G06F 3/16* (2006.01)
   - *G06F 3/0481* (2013.01)
   - *G09B 21/00* (2006.01)

(52) U.S. Cl.
   CPC ............ *G06F 3/167* (2013.01); *G06F 3/0481* (2013.01); *G09B 21/006* (2013.01)

(58) Field of Classification Search
   CPC ... G10K 11/004; G09B 21/006; G06F 3/0481; G06F 3/16; G06F 3/04812; G06F 3/167
   See application file for complete search history.

(56) References Cited

U.S. PATENT DOCUMENTS

| | | | |
|---|---|---|---|
| 5,760,771 A * | 6/1998 | Blonder ............. | G06Q 30/0601 434/118 |
| 6,405,364 B1 | 6/2002 | Bowman-Amuah | |
| 7,490,313 B2 | 2/2009 | Sinclair et al. | |
| 7,554,522 B2 | 6/2009 | Sinclair, II et al. | |
| 7,721,254 B2 | 5/2010 | Relyea et al. | |
| 7,827,527 B1 | 11/2010 | Chiluvuri | |
| 7,831,905 B1 * | 11/2010 | Jennings et al. ............... | 715/236 |
| 7,945,531 B2 | 5/2011 | Mullender et al. | |
| 8,095,911 B2 * | 1/2012 | Ronen et al. ................. | 717/122 |
| 8,146,109 B2 | 3/2012 | Shneerson et al. | |
| 8,261,231 B1 | 9/2012 | Hirsch et al. | |
| 8,336,043 B2 | 12/2012 | Lavery et al. | |
| 2003/0155413 A1 * | 8/2003 | Kovesdi ............ | G06F 17/30873 235/375 |
| 2004/0070612 A1 | 4/2004 | Sinclair et al. | |
| 2005/0071165 A1 * | 3/2005 | Hofstader et al. ......... | 704/270.1 |
| 2005/0289450 A1 * | 12/2005 | Bent et al. .................... | 715/506 |

(Continued)

OTHER PUBLICATIONS

"Accessibility in Windows 8", Retrieved at <<http://www.microsoft.com/enable/products/windows8/>>,Retrieved Date : Dec. 26, 2012, pp. 7.

(Continued)

*Primary Examiner* — Jeffrey A Gaffin
*Assistant Examiner* — Mandrita Brahmachari
(74) *Attorney, Agent, or Firm* — Arent Fox LLP

(57) ABSTRACT

In one embodiment, a user interface narrator may use data binding to associate an item control label 404 with a control list item 402. The user interface narrator may use a narration control 212 of an operating system 210 to vocalize a user interface 222 of an application module 220. The user interface narrator may receive from the application module 220 a control list item 402 associated with an item control label 404 via an item data binding. The user interface narrator may vocalize the item control label 404 with the narration control 212.

20 Claims, 6 Drawing Sheets

(56) References Cited

U.S. PATENT DOCUMENTS

| | | | | |
|---|---|---|---|---|
| 2006/0105310 | A1* | 5/2006 | Mullin | 434/307 R |
| 2006/0139312 | A1 | 6/2006 | Sinclair, II et al. | |
| 2007/0074121 | A1* | 3/2007 | Mullender et al. | 715/744 |
| 2007/0282607 | A1* | 12/2007 | Bond | G10L 13/08 704/260 |
| 2008/0250070 | A1* | 10/2008 | Abdulla | G06F 19/3406 |
| 2009/0199112 | A1* | 8/2009 | DeSerranno | 715/760 |
| 2009/0299730 | A1* | 12/2009 | Joh et al. | 704/9 |
| 2011/0119587 | A1* | 5/2011 | Joy | G11B 27/105 715/720 |
| 2012/0117455 | A1* | 5/2012 | Fogel et al. | 715/221 |
| 2012/0124497 | A1* | 5/2012 | Kasoju et al. | 715/764 |
| 2013/0144625 | A1* | 6/2013 | Kurzweil et al. | 704/260 |

OTHER PUBLICATIONS

"How to Record Screen Video with Byte-scout Screen Capturing Freeware", Retrieved at <<http://bytescout.com/products/enduser/screencapturing/screencapturing_how_to_record_screen_video_tutorial.html>>, Aug. 17, 2010, pp. 4.

"Developer's Guide—Accessibility Support", Retrieved at <<https://developers.google.com/web-toolkit/doc/latest/DevGuideA11y>>, Retrieved Date : Dec. 26, 2012, pp. 8.

Fletcher, Mark., "Screen Recording with Articulate Storyline", Retrieved at <<http://storylineauthors.com?p=249>>, Apr. 5, 2012, pp. 5.

Horowitz, Paul., "How to use the Screen Recorder on a Mac", Retrieved at <<http://osxdaily.com/2010/11/16/screen-recorder-mac/>>, Nov. 16, 2010, pp. 8.

"Screen Readers for Blind Users", Retrieved at <<http://atcoalition.org/article/screen-readers-blind-users>>, Dec. 26, 2012, pp. 2.

Sinofsky, Steven,"Enabling Accessibility", Retrieved at <<http://blogs.msdn.com/b/b8/archive/2012/02/14/enabling-accesibility.aspx>>, Feb. 14, 2012, pp. 24.

"Accessibility", Retrieved at <<http://msdn.microsoft.com/en-us/library/windows/desktop/bb546462.aspx>>, Retrieved Date: Dec. 20, 2012, pp. 14, Foley, Mary Jo, "More on Microsoft 'Jupiter' and What It Means for Windows 8", Retrieved at <<http://www.zdnet.com/blog/microsoft/more-on-microsoft-jupiter-and-what-it-means-for-windows-8/8373>>, Jan. 6, 2011, pp. 9.

Langtree, Ian, "Apple iPad 2 Accessibility Features Review", Retrieved at <<http://www.disabled-world.com/assistivedevices/computer/ipad-2.php>>, Oct. 22, 2011, pp. 3.

"Flash Professional / Best Practices—Accessibility Guidelines", Retrieved at <<http://help.adobe.com/en_US/flash/cs/using/WSd60f23110762d6b883b18f10cb1fe1af6-7b34a.html, Jun. 25, 2010, pp. 4.

Rousset, David "Hands-On Lab: Making Silverlight Applications Accessible", Retrieved at <<http://blogs.msdn.com/b/davrous/archive/2011/05/26/hands-on-lab-making-silverlight-applications-accessible.aspx>>, May 26, 2011, pp. 7.

Miyashita et al., "Making Multimedia Content Accessible for Screen Reader Users", Retrieved at <<http://www.w4a.info/2007/prog/wa-0-miyashita.pdf>>, In Proceedings of the 2007 International Cross-Disciplinary Conference on Web Accessibility, May 7-8, 2007, pp. 2.

* cited by examiner

CUSTOM NARRATION OF A CONTROL LIST VIA DATA BINDING

BACKGROUND

Generally, a software application being executed by a computer may interact with a user via a graphical user interface. The user may use a touchpad, keyboard, mouse, or other input device to enter commands to be carried out by the software application. The graphical user interface may present links, controls, data, or other interactive options to the user in a visual form such as text or images. A person with impaired vision may then be unable to satisfactorily interact with the software application.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using data binding to associate an item control label with a control list item. The user interface narrator may use a narration control of an operating system to vocalize a user interface of an application module. The user interface narrator may receive from the application module a control list item associated with an item control label via an item data binding. The user interface narrator may vocalize the item control label with the narration control.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a user interface narrator for a computing device.

To improve interactions with users, particularly sight-impaired users, a computing device may use a user interface narrator to vocalize user interface items, such as graphics and text. Vocalizing is the creation of audio data to be played to the user representing the user interface items. Rather than have each application module provide narration of the application user interface, the operating system may have a narration control to narrate whichever control list item has received input control focus, such as a keyboard focus. Input control focus refers to the element of the graphical user interface prepared to receive user selection. The control list item may represent a user interface item. The application module may provide custom implementations of a control list item and override a default narration of the control list item. The application module may use an extensible application markup language data binding to connect the control list item to an item control label. A narration control of the operating system may then narrate the item control label rather than try to narrate the control list item. The application module may collect multiple control list items into a control list. The application module may then associate the control list with a list control label. The narration control may then narrate the list control label for any of the control list items in the control list.

Thus, in one embodiment, a user interface narrator may use data binding to associate an item control label with a control list item. The user interface narrator may use a narration control of an operating system to vocalize a user interface of an application module. The user interface narrator may receive from the application module a control list item associated with an item control label via an item data binding. The user interface narrator may vocalize the item control label with the narration control.

Figure 1:
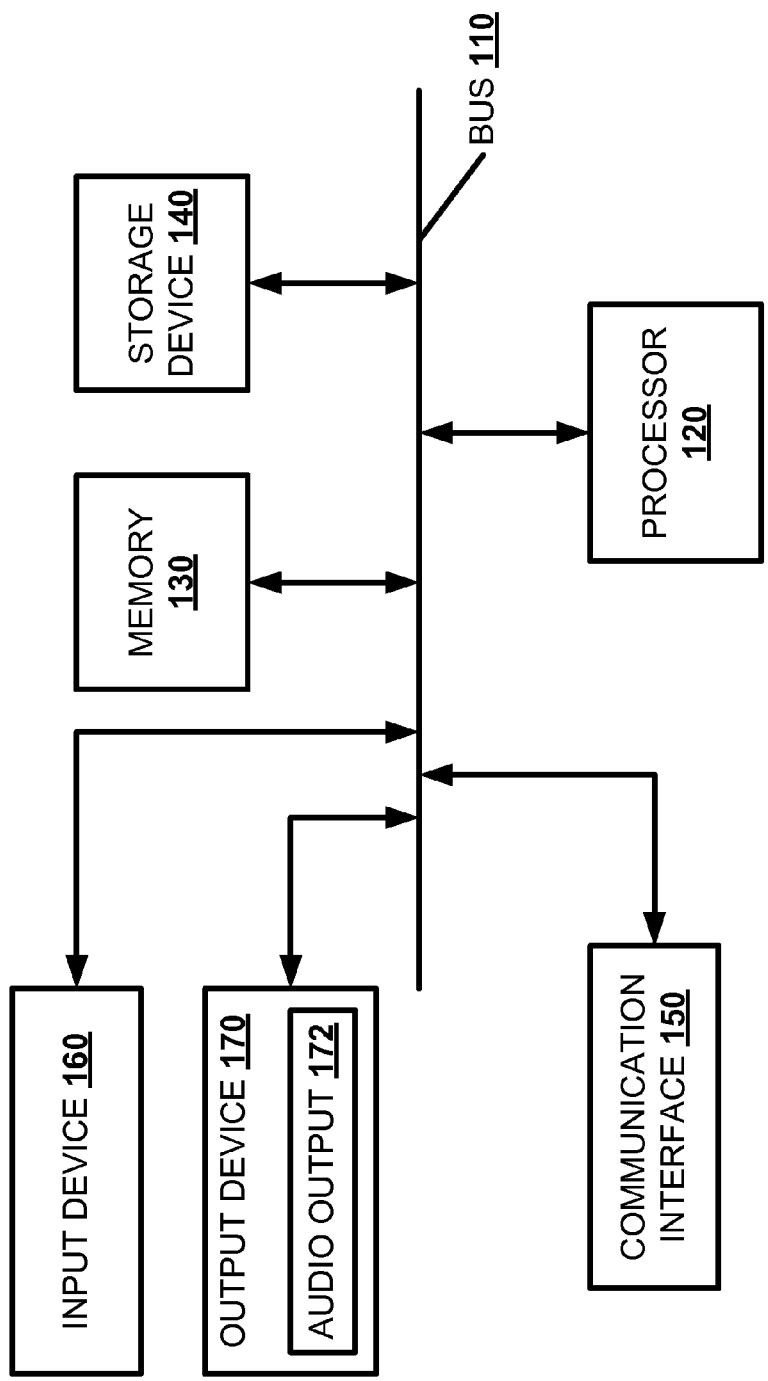
FIG. 1 illustrates, in a block diagram, one embodiment of a computing device.

FIG. 1 illustrates a block diagram of an exemplary computing device 100 which may act as a user interface narrator. The computing device 100 may combine one or more of hardware, software, firmware, and system-on-a-chip technology to implement a user interface narrator. The computing device 100 may include a bus 110, a processor 120, a memory 130, a data storage 140, a communication interface 150, an input device 160, and an output device 170. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface for storing an application module.

The communication interface 150 may include any transceiver-like mechanism that enables computing device 100 to communicate with other devices or networks. The communication interface 150 may include a network interface or a transceiver interface. The communication interface 150 may be a wireless, wired, or optical interface.

The input device 160 may include one or more conventional mechanisms that permit a user to input information to the computing device 100, such as a keyboard, a mouse, a voice recognition device, a microphone, a headset, a gesture recognition device, a touch screen, etc. The output device 170 may include one or more conventional mechanisms that output information to the user, including a display, a printer, or a medium, such as a memory, or a magnetic or optical disk and a corresponding disk drive. Specifically, the output device 170 may be an audio output 172, such as a speaker or headset, to convey information to a user in an audio format.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 150.

Figure 2:
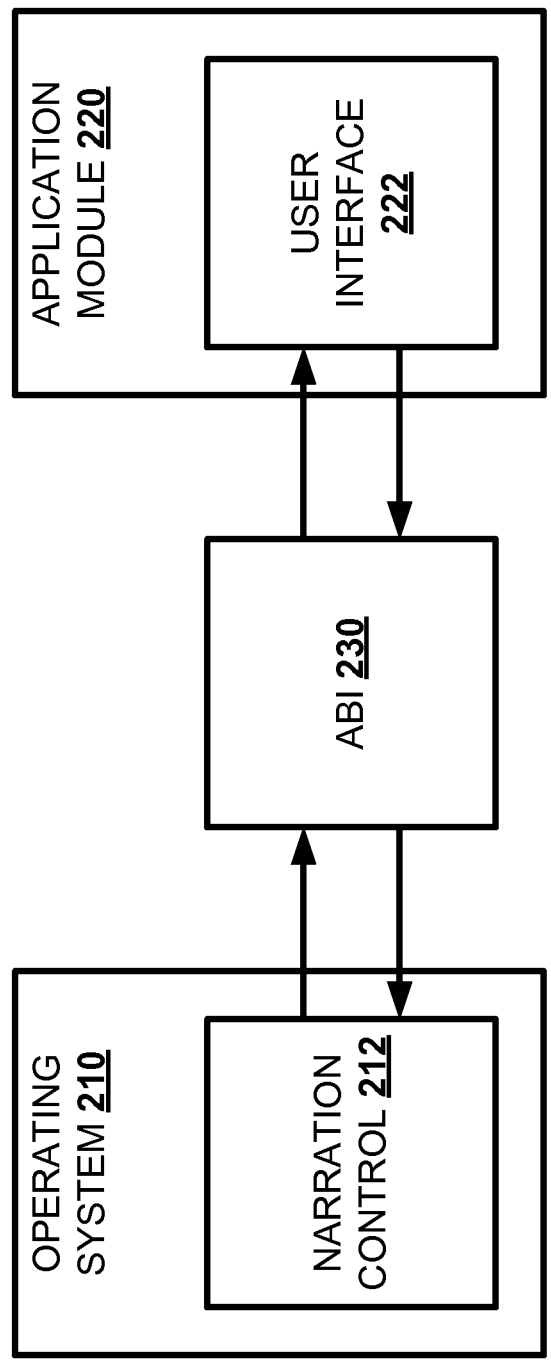
FIG. 2 illustrates, in a block diagram, one embodiment of a software application interaction.

FIG. 2 illustrates, in a block diagram, one embodiment of a software application interaction 200. The computing device 100 may execute an operating system 210. An operating system 210 is a set of software applications that manage the use of hardware resources by an application module 220, as well as interactions between application modules 220. An application module 220 is a software application, or an aspect of a software application. An application module 220 may communicate with the operating system 210 via an application binary interface (ABI) 230. An application binary interface 230 is a tool allowing the application module 220 to access specific tools, functions, and calls provided by the operating system 210. One tool provided by the operating system 210 may be a narration control 212. A narration control 212 converts text from an application module 220 to an audio format to be played for a user. For example, the application module 220 may have a user interface 222 to receive inputs from a user via an input device 160. The narration control 212 may convert text in the user interface 222 to an audio format for presentation to the user.

Figure 3:
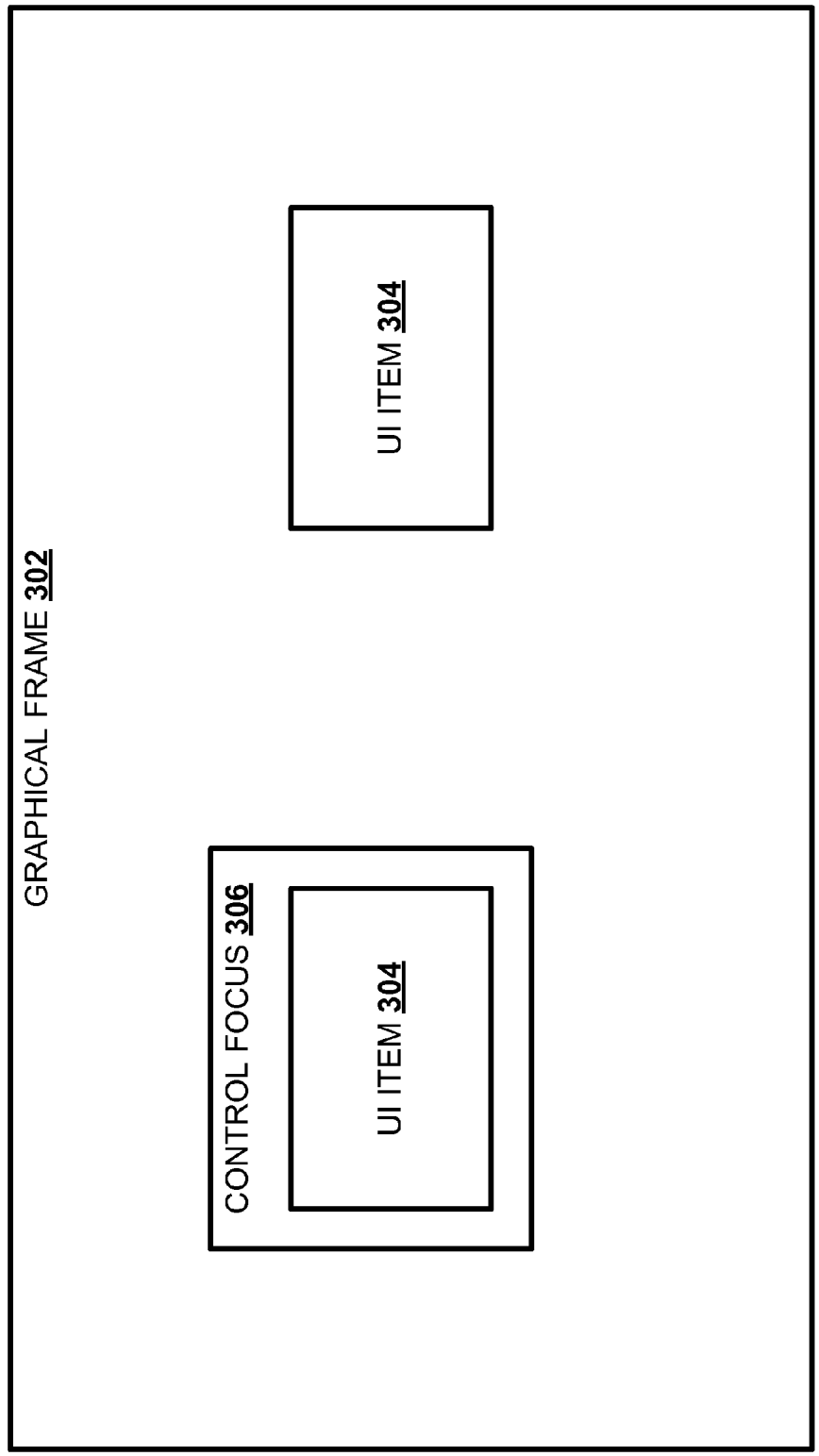
FIG. 3 illustrates, in a block diagram, one embodiment of a graphical user interface.

FIG. 3 illustrates, in a block diagram, one embodiment of a graphical user interface 300. The graphical user interface 300 may present in a graphical frame 302 one or more user interface (UI) items 304. A user interface item 304 may be a control or data shown in the graphical frame 302. A user may use the input device 160 to place a user interface item 304 under input control focus 306. Specifically, if a keyboard is the input device 160 used to apply input control focus 306, the input control focus 306 may be referred to as keyboard focus. The user may use a tab button to move keyboard focus between user interface items 304. Other input devices besides a keyboard may be used to direct input control focus 306. A narration control 212 may vocalize the user interface item 304 under input control focus 306.

To provide proper narration of a user interface item 304, the application module 220 may data bind a user interface item 304 to a narration label describing a set of text to be read and vocalized by the narration control 212. Data binding establishes a connection between a user interface item and business logic. When the user interface item 304 changes value, the elements bound to the user interface item reflect the change automatically.

Figure 4:
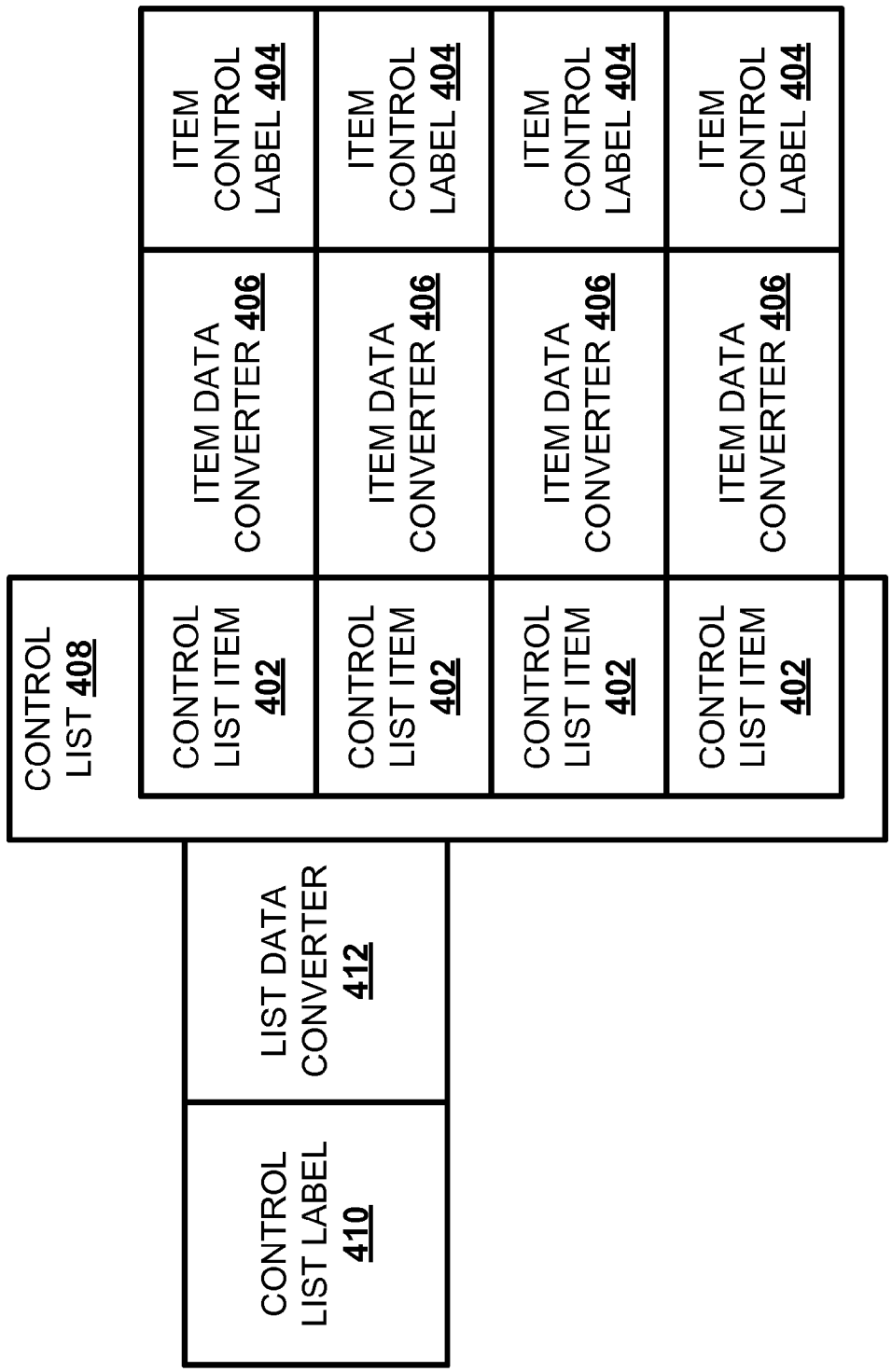
FIG. 4 illustrates, in a block diagram, one embodiment of data binding.

FIG. 4 illustrates, in a block diagram, one embodiment of data binding 400. A control list item 402 may represent a user interface item 304. A control list item 402 may be associated with multiple labels via data binding. A control list item 402 may be associated with an item control label 404 via an item data binding. The item control label 404 may contain a set of text to be vocalized by the narration control 212 for the control list item 402. The list data binding may have an item data converter 406 that converts the control list item 402 into a format readable in the item control label 404.

A control list 408 may contain a set of one or more control list items 402. The control list 408 may be associated with a control list label 410 via a list data binding. The control list label 410 may contain a set of text to be vocalized by the narration control 212 for any control list item 402 in the control list 408. The list data binding may have a list data converter 412 that converts the control list item 402 into a format readable in the control list label 410.

Figure 5:
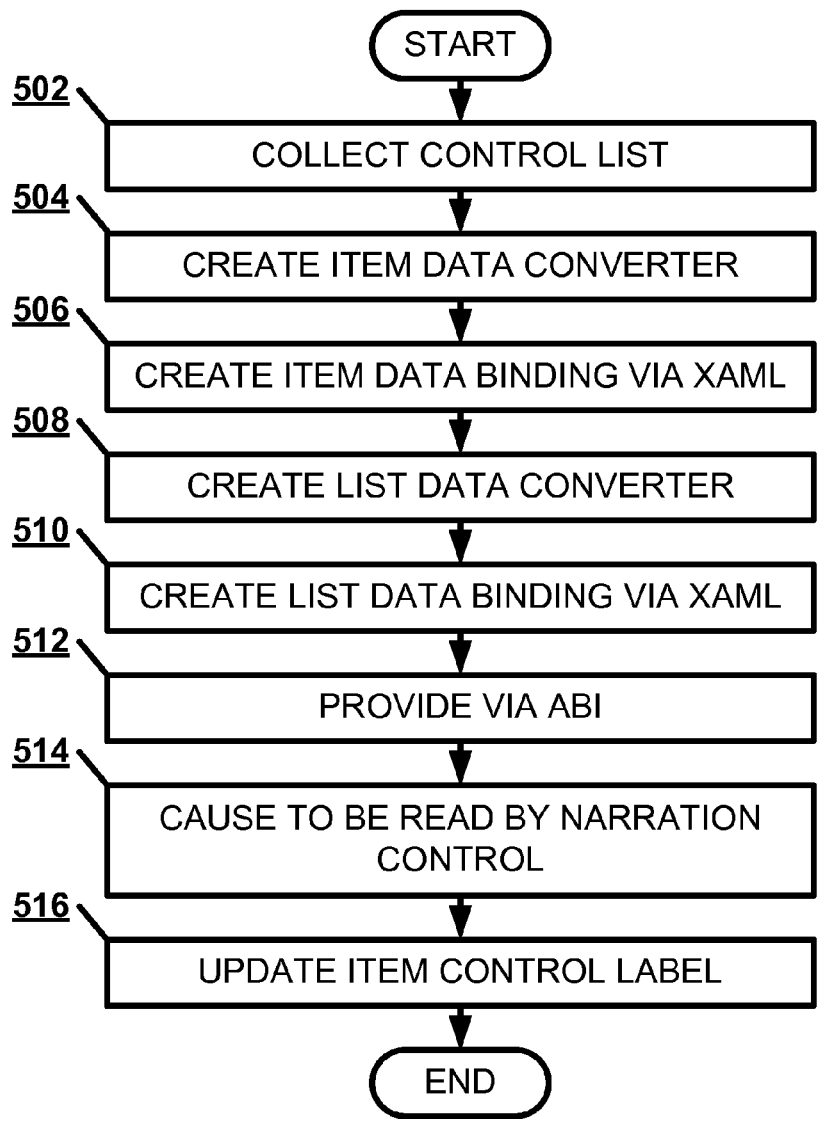
FIG. 5 illustrates, in a flowchart, one embodiment of a method for presenting a control list item to a narration control.

FIG. 5 illustrates, in a flowchart, one embodiment of a method for presenting a control list item 402 to a narration control 212. The application module 220 may collect a control list item 402 in a control list 408 (Block 502). The application module 220 may create an item data converter 406 in an item data binding (Block 504). The application module 220 may use extensible application markup language (XAML) to create the item data binding of a control list item 402 to an item control label 404 to be vocalized by a narration control 212 of an operating system 210 (Block 506). The application module 220 may create a list data converter 412 in a list data binding (Block 508). The application module 220 may use extensible application markup language to create the list data binding between a control list label 410 and a control list 408 (Block 510). The application module 220 may provide the control list item 402 to the narration control 212 via an application binary interface 230 (Block 512). The application module 220 may cause the item control label 404 to be read by a narration control 212 (Block 514). The application module 220 may update the item control label 404 (Block 516).

Figure 6:
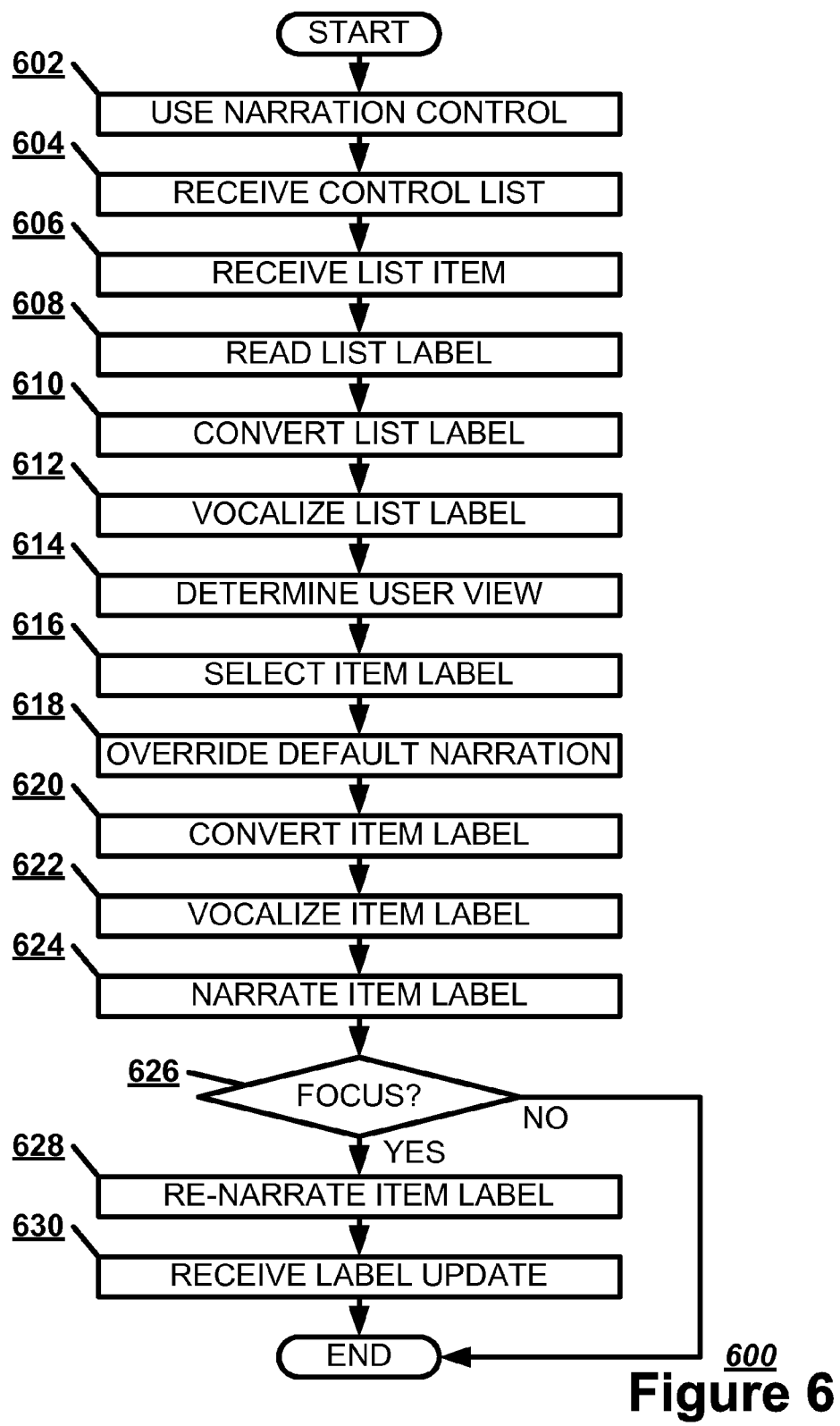
FIG. 6 illustrates, in a flowchart, one embodiment of a method for vocalizing a control list item with a narration control.

FIG. 6 illustrates, in a flowchart, one embodiment of a method for vocalizing a control list item 402 with a narration control 212. The operating system 210 may use a narration control 212 to vocalize a user interface 222 of an application module 220 (Block 602). The operating system 210 may receive a control list 408 containing a control list item 402 (Block 604). The operating system 210 may receive via an application binary interface 230 from the application module 220 a control list item 402 associated with an item control label 404 via an item data binding (Block 606). The operating system 210 may read a control list label 410 associated with a control list 408 via a list data binding (Block 608).

The operating system 210 may convert the control list label 410 based on a list data converter 412 of the item data binding (Block 610). The operating system 210 may vocalize the control list label 410 with the narration control 212 (Block 612). The operating system 210 may determine a user view of the user interface 222 (Block 614). The operating system 210 may select the item control label 404 based on a user view of the user interface 222 (Block 616). The operating system 210 may override a default narration of the control list item 402 (Block 618). The operating system 210 may convert the item control label 404 based on an item data converter 406 of the item data binding (Block 620). The operating system 210 may vocalize the item control label 404 with the narration control 212 (Block 622). The operating system 210 may narrate the item control label 404 upon input control focus of the control list item 402, along with any control list labels 410 present (Block 624). If the input control focus remains on the control list item 402 (Block 626), the operating system 210 may re-narrate the item control label 404 (Block 628). The operating system 210 may receive a label update for the item control label 404 (Block 630).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A machine-implemented method, comprising:
   using a narration control of an operating system to vocalize a user interface of an application module;
   receiving from the application module a control list describing user interface items of the user interface;
   receiving in the control list a control list item representing a user interface item;
   establishing a connection between the control list item and business logic via an item data binding having an item data converter;
   converting the control list item with the item data converter into a format readable in an item control label containing a set of text to be vocalized by the narration control; and
   vocalizing the set of text described by the item control label with the narration control to override a default narration of the user interface item.

2. The method of claim 1, further comprising:
   receiving the control list item via an application binary interface.

3. The method of claim 1, further comprising:
   converting a control list label based on a list data converter of the list data binding.

4. The method of claim 1, further comprising:
   reading a control list label associated with the control list via a list data binding.

5. The method of claim 1, further comprising:
   determining a user view of the user interface.

6. The method of claim 1, further comprising:
   selecting the item control label based on a user view of the user interface.

7. The method of claim 1, further comprising:
   associating the control list item with multiple labels via the item data binding.

8. The method of claim 1, further comprising:
   vocalizing for the control data item a control list label associated with a control list containing the control data item via a list data binding.

9. The method of claim 1, further comprising:
   narrating the item control label upon input control focus of the control list item.

10. The method of claim 1, further comprising:
    re-narrating the item control label if input control focus remains on the control list item.

11. The method of claim 1, further comprising:
    receiving a label update for the item control label.

12. A tangible machine-readable medium having a set of instructions detailing a method stored thereon that when executed by one or more processors cause the one or more processors to perform the method, the method comprising:
    collecting a control list describing a user interface of an application module;
    describing in a control list item of the control list a user interface item of the user interface;

creating a connection between the control list item and business logic via an item data binding having an item data converter;

converting the control list item with the item data converter into a format readable in an item control label containing a set of text to be vocalized by a narration control of an operating system; and presenting the set of text described by the item control label to a narration control to override a default narration of the control list item.

13. The tangible machine-readable medium of claim 12, wherein the method further comprises:

providing the control list item to the narration control via an application binary interface.

14. The tangible machine-readable medium of claim 12, wherein the method further comprises:

associating the control list item with multiple labels via the item data binding.

15. The tangible machine-readable medium of claim 12, wherein the method further comprises:

creating a list data binding between a control list label and a control list.

16. The tangible machine-readable medium of claim 12, wherein the method further comprises:

converting the control list with a list data converter into a format readable in a list control label.

17. The tangible machine-readable medium of claim 12, wherein the method further comprises:

updating the item control label.

18. The tangible machine-readable medium of claim 12, wherein the method further comprises:

using extensible application markup language to create the item data binding.

19. A user interface narrator, comprising:

a memory configured to store an application module having a user interface an operating system having a narration control to vocalize the user interface of the application module;

a processor configured to execute:

the application module to collect a control list describing a user interface of an application module, to create a connection between the control list and business logic via a list data binding having a list data converter, and to convert the control list with the list data converter into a format readable in a control list label containing a set of text to be vocalized by the narration control, and the narration control to vocalize the set of text described by the control list label to override a default narration of the user interface; and an audio output configured to vocalize the set of text described by the control list label with the narration control to override a default narration of the control list item.

20. The user interface narrator of claim 19, wherein the application module creates an item data binding having a item data converter between a control list item of the control list and an item control label.

* * * * *